(No Model.) 2 Sheets—Sheet 1.

E. W. COOKE.
JOURNAL BOX.

No. 442,357. Patented Dec. 9, 1890.

Witnesses:

Inventor:
Ernest W. Cooke
by Haupt Brothers
ATTORNEY.

(No Model.) 2 Sheets—Sheet 2.

E. W. COOKE.
JOURNAL BOX.

No. 442,357. Patented Dec. 9, 1890.

Witnesses:

Inventor:
Ernest W. Cooke
by
Haupt Brothers
ATTORNEY.

UNITED STATES PATENT OFFICE.

ERNEST WM. COOKE, OF CHICAGO, ILLINOIS, ASSIGNOR TO THE AMERICAN ROLLER BEARING COMPANY, OF SAME PLACE.

JOURNAL-BOX.

SPECIFICATION forming part of Letters Patent No. 442,357, dated December 9, 1890.

Application filed February 5, 1890. Serial No. 339,307. (No model.)

*To all whom it may concern:*

Be it known that I, ERNEST WILLIAM COOKE, a citizen of the United States, residing in Chicago, county of Cook, and State of Illinois, have invented a new and useful Improvement in Journal-Boxes, of which the following is a specification.

My invention relates to journal-boxes in which a shaft is held between a series of rollers, the said rollers being supported by a series of rings secured together by rods, and which said rings revolve about the shaft, the lateral motion of the said rings being taken up by balls held in pits of set-screws, said screws being secured by a nut. The end-thrust of the shaft is taken up by a series of balls revolving in a pit in the end of said shaft and one ball revolving against the series of balls. The one ball is held against the series of balls by a plate, spring, and set-screw, which is fastened to the outer cap of the box. The plate which carries the one ball has lateral motion, which allows the shaft to move laterally at will, my object being to provide a mechanism that will reduce the friction of the bearing and provide a means to take up the slack at the end of the shaft. This object I attain through the mechanism shown in the accompanying drawings, in which—

Figure 1:
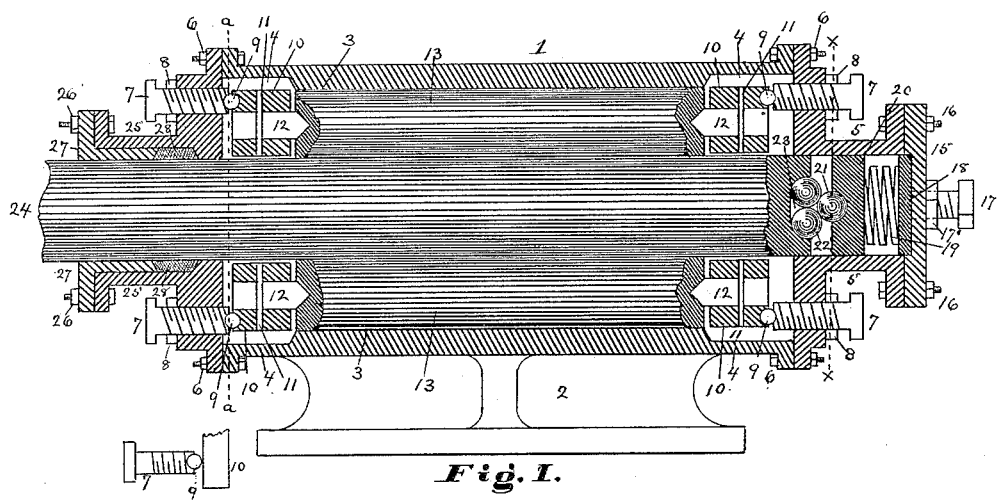
Figure 2:
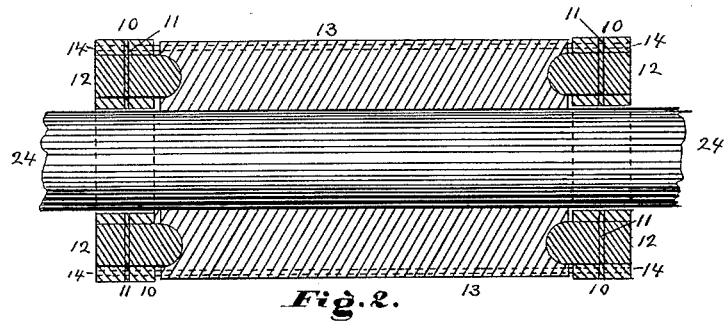
Figure 3:
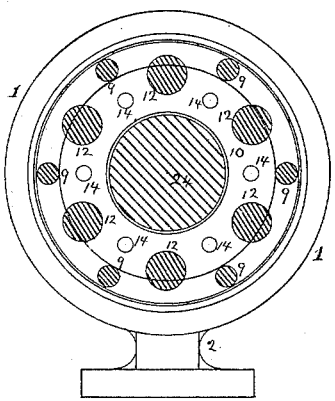
Figure 4:
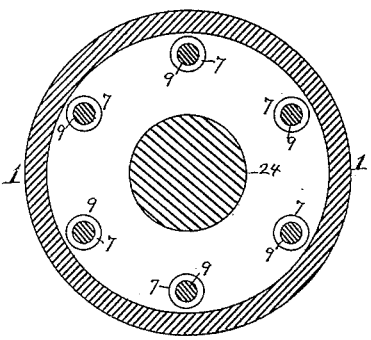
Figure 5:
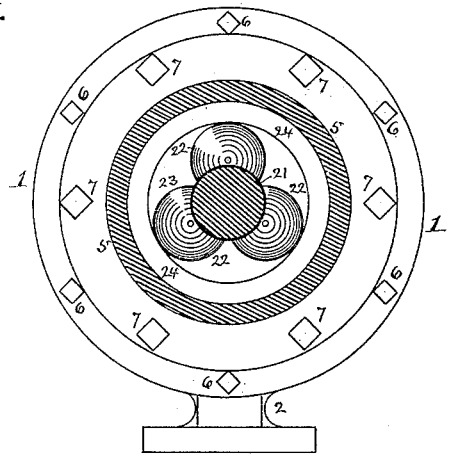

Figure 1 is a vertical section through the box in the median line. Fig. 2 is a sectional view of the rollers and rings with spherical pivots. Fig. 3 is a sectional view made on the line *a a*, showing the end of the ring and the ball-bearings for the ring. Fig. 4 is a sectional view showing the end cap and screw take-up. Fig. 5 is a sectional view of the line X X, showing the end of the shaft and the balls *in situ*.

Similar figures refer to similar parts throughout the several views.

I use a journal-box 1, of a cylindrical or other convenient form, with a base 2, and at each end of the journal-box I provide appliances for bolting on caps 5 and 25. Within the journal-box at each end I drill out chamber 4 larger than the bore of the center of the journal-box. The bore in the body of the journal-box is of a size just sufficient to allow of the rolling of the rollers 13 and the axle 24 within the said bore 3.

On the end of the journal-box at one end I fit a cap or cover 5. This said cap 5 is drilled at convenient points and provided with a screw-thread, which is made to accommodate the take-up screws 7. These take-up screws 7 have on their points a pit for holding the ball 9. These take-up screws 7 are held in position by the lock-nuts 8. The cap 5 is bolted to the body 1 by the bolts 6. The outer end of the cap 5 is bolted by the bolts 16 to the cover or plate 15, which cover 15 has a hole in the center threaded to provide for the reception of the screw 17 for adjusting the tension of the spring 19, and the said take-up screw 17 is held in position and secured by a lock-nut 17'. Within the said cap 5 is a cylindrical bore, and on the inner face of the plate 15 is a cylindrical pit of equal diameter with the bore of the cap 5.

Resting in the pit in the plate 15 is a bearing-plate 18, which is of equal diameter with the cylindrical bore of the cap 5. This said plate 18 is made to move within the cylindrical bore of the cap 5 and is the bearing-plate for the spring 19. The said bearing-plate 18 is adjusted by the screws 17. Resting against the plate 18 is a spiral spring 19, which rests against the pivot-plate 20. The said pivot-plate is of a cylindrical shape and of a disk form and slides in the bore of the cap 5.

In the face of the pivot-plate 20 opposite to the spiral spring is a pit of any suitable form, carrying a metallic ball 21, which ball 21 is in the center line with the shaft 24. The said ball 21 rolls against the series of three balls 22, which roll in a suitable pit 23 in the center of a shaft 24.

In the end of each take-up screw 7 is a pit made of suitable shape and depth to carry a metallic ball 9, which ball 9 revolves against an annular groove in the outer face of the ring 10. The ring 10 is united with one of similar construction at the other end of the box 1. These said rings 10 are united to each other by the rods 14, which run horizontally, and the rods 14 are pinned to the rings by the radial pins 11.

At a convenient point in the outer surface of each of the rings 10, I make an annular groove, against which said groove the balls 9 revolve, they being held in the pit at the end of the take-up screws 7.

At convenient points in the rings 10, I insert a series of pins 12, which serve as the pivots about which roll the rollers 13. The pins 12 are held firmly in place by the radial pins 11.

At the outer end of the box 1 I place a circular cap or stuffing-box 25, which incloses the shaft 24 and is secured to the box 1 by the bolts 6. At convenient points the cap 25 is drilled with holes and threaded for the reception of the take-up screws 7, which carry the balls 9. The said take-up screws 7 are secured in place by the lock-nuts 8. I bore out the center of the cap 25, and into it I fit a gland 27, which is made to fit the shaft 24 closely and the whole of the cap 25. In the end of the gland 27 I place a packing 28, which is held tight around the shaft by the gland 27 and compressed so as to keep any lubricant I may place in the box from escaping. The gland 27 is secured to the cap or stuffing-box 25 by bolts 26.

At each end of the box 1 I enlarge the diameter of the bore for the purpose of giving clearance between the outside diameter of the rings and the inside diameter of the box.

Having now described the parts of my invention, I proceed to explain the method of using the same. I put the parts together so that the shaft 24 shall revolve within the rings 10, rods 14, and rollers 13, the ends of the rollers 13 being held by the pivot-pins 12. The said rings 10 roll against the metallic balls 9, which balls 9 are held by the take-up screws 7. The screws 7 are adjusted so that all the slack between the rings 10 and the take-up screws 7 is taken up, whereupon the lock-nuts 8 are secured, so as to prevent the take-up screws 7 becoming loose. The end of the shaft carries the three balls 22 in the pit 23, and a fourth ball 21 is held against the three balls 22 by the bearing-plate 20, which is held up against the ball 21 by the spring 19, which is rendered more or less tight by means of a take-up screw 17 acting on the plate 18. The take-up screw 17 is secured by the lock-nut 17'. The space within the box 1 is filled with a fluid lubricant after the caps 5 and 25 have been bolted to the said box 1 by the bolts 6. The gland 27 is then adjusted by the bolts 26, so that the packing 28 is compressed and prevents the lubricant from escaping.

I am aware that journal-boxes have been used prior to my invention, and I do not therefore lay claim in a broad sense of journal-box; but What I do claim, and desire to secure by Letters Patent, is—

1. In combination with a shaft having a pit in the end thereof, a roller-bearing surrounding said shaft, a series of balls placed in the recess in the end of the shaft, a single ball adapted to roll against the series of balls, and a bearing-plate having a pit to retain said single ball in position, all substantially as and for the purpose set forth and described.

2. In a roller-bearing, a casing, collars therein provided with pins entering recesses in the ends of the rollers and supporting the latter, and means passing through the ends of the casing for independently adjusting said collars, all substantially as and for the purpose set forth and described.

3. In a roller-bearing, a casing, collars therein provided with means for supporting the rollers and having pits in their ends opposite the rollers, balls seated in said pits, and means for holding said balls in their pits, all substantially as and for the purpose set forth and described.

4. In a roller-bearing, a casing, collars therein provided with means at one end for supporting the rollers and with pits on their opposite ends, screws passing through the casing and provided with pits in their ends, and balls seated between said collars and screw ends in the pits thereof, all substantially as and for the purpose set forth and described.

5. In combination with a shaft having a pit in the end thereof, a roller-bearing surrounding said shaft, a series of balls placed in the recess in the end of the shaft, a single ball adapted to roll against the series of balls, a bearing-plate having a pit to retain said single ball in position, and means back of said bearing-plate for yieldingly retaining and adjusting it, all substantially as and for the purpose set forth and described.

6. In combination with a roller-bearing having collars provided with pins for supporting the rollers and allowing them to revolve thereupon, and balls bearing against the end of the shaft, a lubricant-tight casing provided with means in its ends for adjusting the collars and rollers, all substantially as and for the purpose set forth and described.

ERNEST WM. COOKE.

In presence of—
T. McALLISTER,
T. E. SHEEBE.